F. LILLICH.
CAR FENDER.
APPLICATION FILED JULY 19, 1911.
1,017,431.
Patented Feb. 13, 1912.
2 SHEETS—SHEET 1.
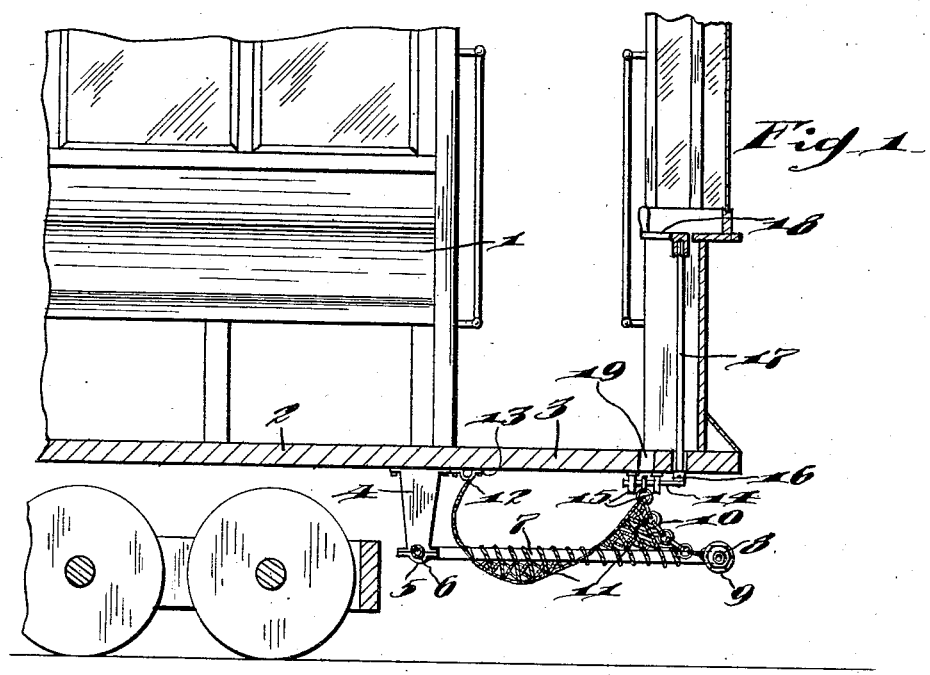
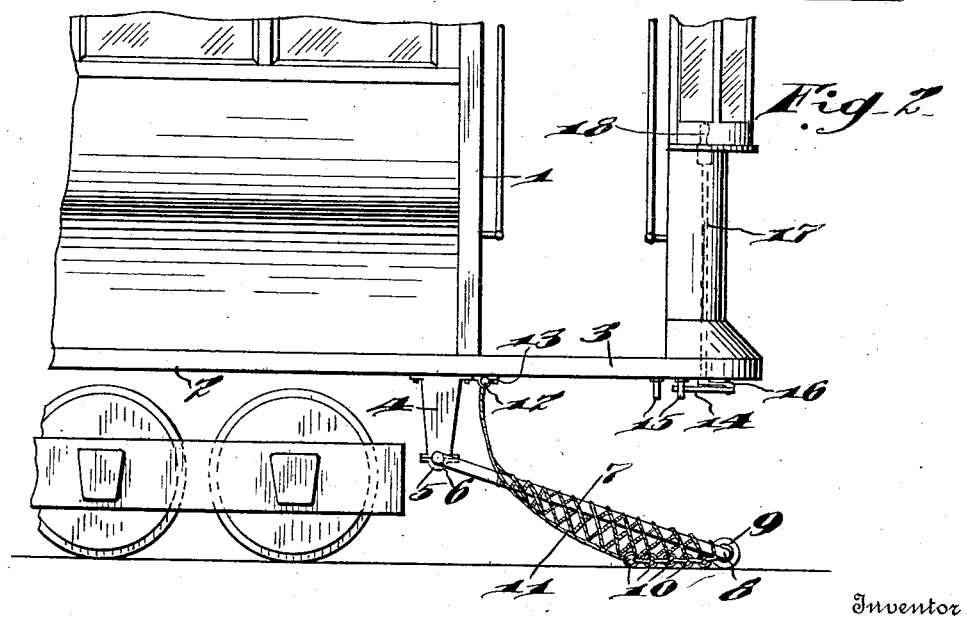
Witnesses
Thos. Riemann
R. H. Krenkel
Inventor
Frederick Lillich,
By Joshua R. H. Potts,
Attorney F. LILLICH.
CAR FENDER.
APPLICATION FILED JULY 19, 1911.
1,017,431.
Patented Feb. 13, 1912.
2 SHEETS—SHEET 2.
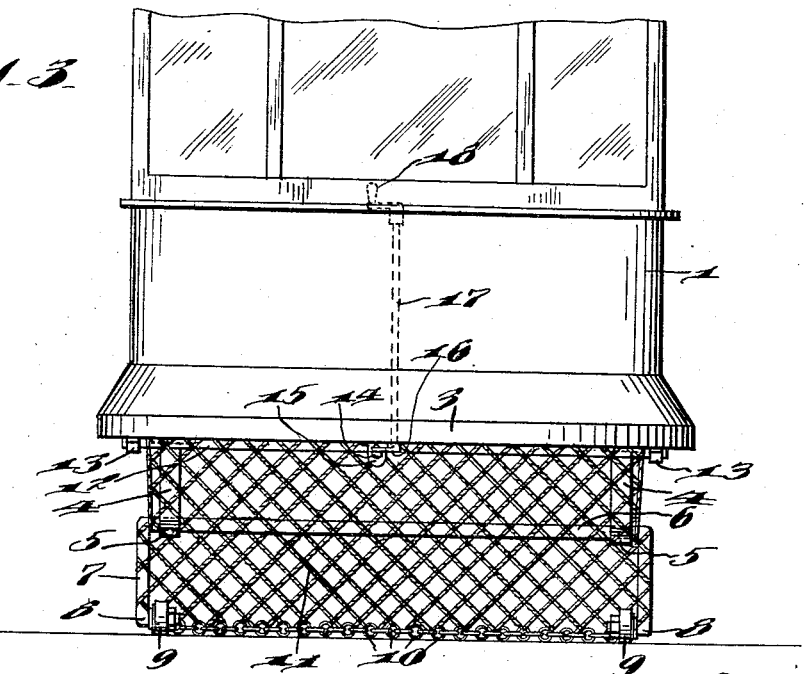
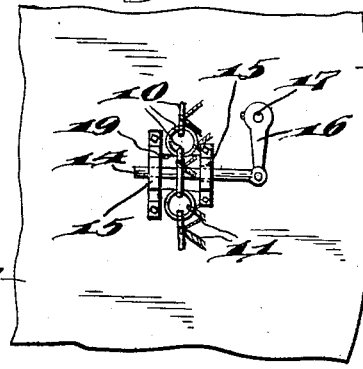
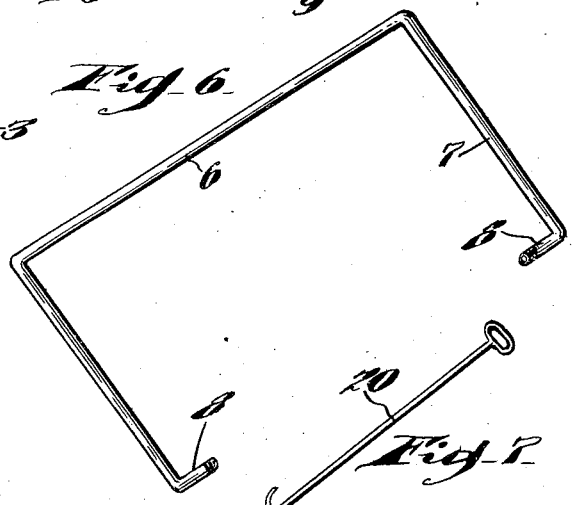
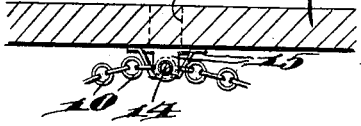
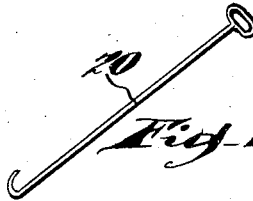
Witnesses
Thro. Psemann
R. N. Krenkel.
Inventor
Frederick Lillich,
By Joshua R. H. Potts.
Attorney

UNITED STATES PATENT OFFICE.

FREDERICK LILLICH, OF PHILADELPHIA, PENNSYLVANIA.

CAR-FENDER.

1,017,431.  Specification of Letters Patent.  Patented Feb. 13, 1912.

Application filed July 19, 1911. Serial No. 639,273.

*To all whom it may concern:*

Be it known that I, FREDERICK LILLICH, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide an improved fender which insures the picking up of a person or object on the track, and absolutely prevents any possibility of the person or object from falling over the back of the fender.

A further object is to provide a fender having a flexible device such as a chain at its forward edge which operates as a drag so as to effectually scoop up a person or object on the track.

A further object is to provide improved means for holding the fender in its normally elevated position, and which means when operated, will release the fender and permit it to fall.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating my improved fender in its normally elevated position. Fig. 2, is a view in side elevation showing the fender dropped, and ready to pick up a person or object on the track. Fig. 3, is a view in end elevation of Fig. 2. Fig. 4, is a bottom view of the car platform showing the fender holding means. Fig. 5, is a view in transverse section through Fig. 4. Fig. 6, is a perspective view of the fender frame, and Fig. 7 is a view of the hook 20 which is adapted for use in raising the fender.

1, represents a car and 2 the bottom thereof, which at its forward end constitutes a platform 3 for the motorman. Brackets 4 are secured to the bottom of the car, and have bearings 5 at their lower ends in which the rear transverse bar 6, of my improved fender frame 7 is mounted to turn. This fender frame 7 may be made in various ways, a simple form being to bend an approximately heavy bar or pipe into general rectangular shape, open at its front end where it is provided with inwardly projecting stubs 8, on which rollers 9 are mounted to run on the track. The stubs 8 are connected by a chain 10, which is preferably composed of ground links and is of sufficient length to drag along the ground with considerable slack between the ends of the chain. A rope netting 11 is secured at its forward edge to said chain, at its side edges to the side members of frame 7, and at its upper edge is secured around a rod 12, which is secured to the bottom of the platform 3 by means of brackets 13. It will therefore be noted that the fender netting 11 is connected to the bottom of the platform, so that a partition is formed which absolutely prevents a person or object from passing over the fender when picked up, and the netting constitutes a flexible receptacle for the reception of the body, as it is to be understood that the netting is not secured to the transverse rod or shaft portion 6 of the frame, but to the bottom of the car as above described.

To hold the fender in its elevated position shown in Fig. 1, a sliding bar 14 is mounted to move through bearings 15 secured to the bottom of platform 3, and when this bar 14 engages through one of the links of the chain, it will hold the fender elevated. The forward end of this bar 14 is connected to a crank arm 16 on the lower end of a shaft 17, which projects up through the car platform, and is provided on its upper end with a removable crank handle 18. An opening 19 is provided in the car platform for the reception of a hook bar 20 shown in Fig. 7. When the fender is down, this hook bar is positioned through opening 19, and engages one of the links of chain 10. This chain and the fender is then manually drawn upward, and while held in its upward position, shaft 17 is moved so that the bar 14 is projected through one of the links of the chain. The hook bar 20 is then hung on the dash board, or otherwise conveniently placed for future use.

When the motorman sees a person or object on the track, he turns the crank arm 18 to turn shaft 17, and draw the bar 14 out of the link of the chain. The fender then falls by gravity to the position shown in Fig. 2, and the chain dragging along the ground will effectually pick up anything on the track.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A fender comprising a frame, a flexible slack drag at the forward end of the frame, and means on the car engaging the intermediate portion of said drag to hold the fender in elevated position, substantially as described.

2. A fender comprising a frame, rollers at the forward end of the frame adapted to run on the track, a flexible slack drag at the forward end of the frame, and means on the car engaging the intermediate portion of said drag to hold the fender in elevated position, substantially as described.

3. A fender comprising a pivoted frame, a flexible netting secured in said frame, a flexible slack drag secured to said frame and to the forward end of said netting, and means on the car engaging the intermediate portion of said drag to hold the fender in elevated position, substantially as described.

4. A fender comprising a support, a frame pivoted to the support, a netting secured to said frame, a chain connected at its ends to the frame and between its ends to said netting, said chain constituting a drag, and means on the car engaging the intermediate portion of said chain to hold the fender in elevated position, substantially as described.

5. The combination with a car, brackets secured to the bottom of the car, a fender frame pivotally mounted in said brackets, a chain drag connected to the forward end of said frame, and a sliding bar on the bottom of said platform constructed to be projected through one of the links of the chain to hold the fender in elevated position, substantially as described.

6. The combination with a car, brackets secured to the bottom of the car, a fender frame pivotally mounted in said brackets, a chain drag connected to the forward end of said frame, a sliding bar on the bottom of said platform constructed to be projected through one of the links of the chain to hold the fender in elevated position, a crank shaft mounted in the car platform, and connected to said bar, and a removable crank arm on the upper end of said crank shaft, substantially as described.

7. The combination with a car, brackets secured to the bottom of the car, a fender frame pivotally mounted in said brackets, a chain drag connected to the forward end of said frame, a sliding bar on the bottom of said platform constructed to be projected through one of the links of the chain to hold the fender in elevated position, a crank shaft mounted in the car platform, and connected to said bar, a removable crank arm on the upper end of said crank shaft, parallel brackets guiding the movement of said bar, and said platform having an opening therethrough substantially as, and for the purpose set forth.

In testimony whereof I have signed my name to this specification in the presence of two subscribing witnesses.

FREDERICK LILLICH.

Witnesses:
R. H. KRENKEL,
CHARLES E. POTTS.

---

Copies of this patent may be obtained for five cents each, by addressing the "Commissioner of Patents, Washington, D. C."